(12) United States Patent
Seagraves et al.

(10) Patent No.: US 12,592,901 B2
(45) Date of Patent: Mar. 31, 2026

(54) SYSTEMS AND METHOD FOR EFFICIENT ROUTING BASED UPON IDENTIFIED SUBJECT MATTER

(71) Applicant: Truist Bank, Charlotte, NC (US)

(72) Inventors: Susan Seagraves, Charlotte, NC (US); Sarah Eckenrod, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 67 days.

(21) Appl. No.: 18/428,582

(22) Filed: Jan. 31, 2024

(65) Prior Publication Data

US 2025/0247351 A1 Jul. 31, 2025

(51) Int. Cl.
G06F 15/16 (2006.01)
G10L 15/18 (2013.01)
G10L 15/26 (2006.01)
H04L 51/21 (2022.01)

(52) U.S. Cl.
CPC .......... H04L 51/21 (2022.05); G10L 15/1822 (2013.01); G10L 15/26 (2013.01)

(58) Field of Classification Search
CPC ..... H04L 51/21; H04L 67/306; H04L 67/535; H04L 67/63; G10L 15/1822; G10L 15/26; G10L 2015/088; G10L 15/063; G10L 15/1815; G06F 40/205; G06F 40/226
See application file for complete search history.

(56) References Cited

U.S. PATENT DOCUMENTS

| | | | |
|---|---|---|---|
| 10,395,648 B1* | 8/2019 | Benkreira ............ | G06Q 30/015 |
| 11,463,587 B1* | 10/2022 | Williams .......... | H04M 3/42221 |
| 2003/0113700 A1* | 6/2003 | Simon ...................... | G09B 5/00 |
| | | | 434/350 |
| 2005/0262114 A1* | 11/2005 | Nevin ..................... | G06F 16/38 |
| 2011/0043652 A1* | 2/2011 | King ..................... | G06F 40/194 |
| | | | 707/706 |
| 2017/0169325 A1* | 6/2017 | McCord ................. | G06N 20/00 |
| 2017/0262529 A1* | 9/2017 | Chim ................. | G06F 16/3329 |
| 2022/0060580 A1* | 2/2022 | Dunn ................. | H04M 3/4938 |
| 2022/0131978 A1* | 4/2022 | Scott ................. | H04M 3/42068 |
| 2022/0415327 A1* | 12/2022 | Fowers .................. | G10L 15/26 |
| 2023/0015090 A1* | 1/2023 | Sharpe ................. | G06N 5/022 |

* cited by examiner

*Primary Examiner* — Suraj M Joshi
*Assistant Examiner* — Hao H Nguyen
(74) *Attorney, Agent, or Firm* — Jordan IP Law LLC; Michael A. Springs, Esq.

(57) ABSTRACT

A method, computer program product, and computer system for receiving, by a computing device, a communication sent from a first user. Text of the communication may be analyzed to determine a topic of the communication. A second user associated with the topic of the communication may be identified. The communication may be routed to the second user based upon, at least in part, identifying the second user associated with the topic of communication and the topic of the communication.

15 Claims, 7 Drawing Sheets

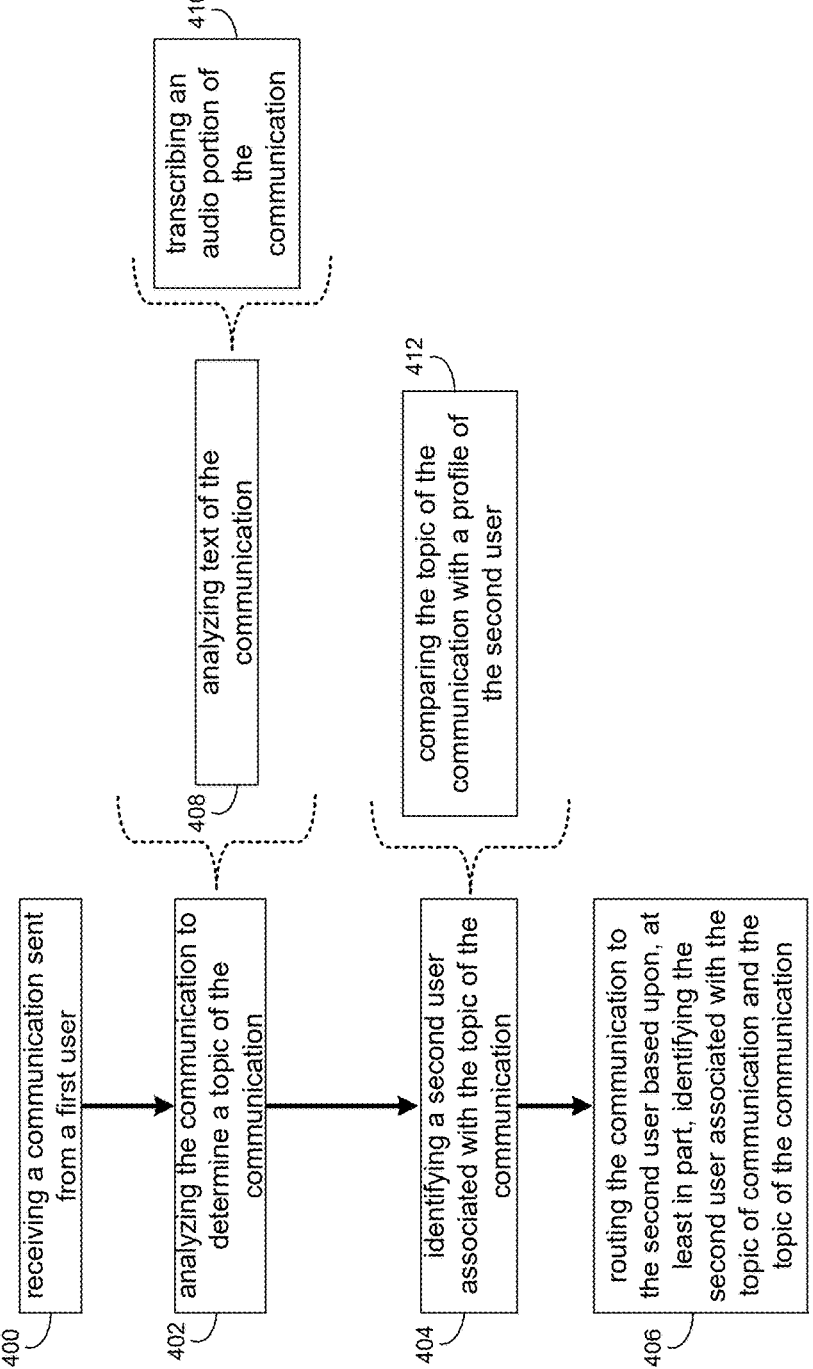

transcribing an audio portion of the communication

410 analyzing text of the communication

408 comparing the topic of the communication with a profile of the second user

412 receiving a communication sent from a first user

400 analyzing the communication to determine a topic of the communication

402 identifying a second user associated with the topic of the communication

404 routing the communication to the second user based upon, at least in part, identifying the second user associated with the topic of communication and the topic of the communication

SYSTEMS AND METHOD FOR EFFICIENT ROUTING BASED UPON IDENTIFIED SUBJECT MATTER

TECHNICAL FIELD

The present disclosure relates to efficient complaint routing, and more particularly, to efficient complaint routing based upon subject matter expertise and efficiency of a complaint servicer.

BACKGROUND

Online financial transactions have made the world a much more convenient place. This includes things like online banking, mortgage services, etc. Every so often, a customer may have a question or some other issue, where they wish to voice their concern/complaint to a customer service representative.

SUMMARY

In one example implementation, a computer-implemented method, performed by one or more computing devices, may include but is not limited to receiving, by a computing device, a communication sent from a first user. Text of the communication may be analyzed to determine a topic of the communication. A second user associated with the topic of the communication may be identified. The communication may be routed to the second user based upon, at least in part, identifying the second user associated with the topic of communication and the topic of the communication.

One or more of the following example features may be included. Analyzing the text of the communication may include transcribing an audio portion of the communication. Transcribing the audio portion of the communication may include performing speech-to-text recognition. The communication may be routed automatically to the second user. Identifying the second user associated with the topic of the communication may include comparing the topic of the communication with a profile of the second user. Identifying the second user associated with the topic of the communication may be based upon, at least in part, a weighting system. The weighting system may include one or more of an expertise of the second user, a current workload of the second user, an experience level of the second user, and a status of the second user.

In another example implementation, a computing system may include one or more processors and one or more memories configured to perform operations that may include but are not limited to receiving, by a computing device, a communication sent from a first user. Text of the communication may be analyzed to determine a topic of the communication. A second user associated with the topic of the communication may be identified. The communication may be routed to the second user based upon, at least in part, identifying the second user associated with the topic of communication and the topic of the communication.

One or more of the following example features may be included. Analyzing the text of the communication may include transcribing an audio portion of the communication. Transcribing the audio portion of the communication may include performing speech-to-text recognition. The communication may be routed automatically to the second user. Identifying the second user associated with the topic of the communication may include comparing the topic of the communication with a profile of the second user. Identifying the second user associated with the topic of the communication may be based upon, at least in part, a weighting system. The weighting system may include one or more of an expertise of the second user, a current workload of the second user, an experience level of the second user, and a status of the second user.

In another example implementation, a computer program product may reside on a computer readable storage medium having a plurality of instructions stored thereon which, when executed across one or more processors, may cause at least a portion of the one or more processors to perform operations that may include but are not limited to receiving, by a computing device, a communication sent from a first user. Text of the communication may be analyzed to determine a topic of the communication. A second user associated with the topic of the communication may be identified. The communication may be routed to the second user based upon, at least in part, identifying the second user associated with the topic of communication and the topic of the communication.

One or more of the following example features may be included. Analyzing the text of the communication may include transcribing an audio portion of the communication. Transcribing the audio portion of the communication may include performing speech-to-text recognition. The communication may be routed automatically to the second user. Identifying the second user associated with the topic of the communication may include comparing the topic of the communication with a profile of the second user. Identifying the second user associated with the topic of the communication may be based upon, at least in part, a weighting system. The weighting system may include one or more of an expertise of the second user, a current workload of the second user, an experience level of the second user, and a status of the second user.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 4 is an example flowchart of a routing process according to one or more example implementations of the disclosure;

Like reference symbols in the various drawings indicate like elements.

DESCRIPTION

Figure 1:
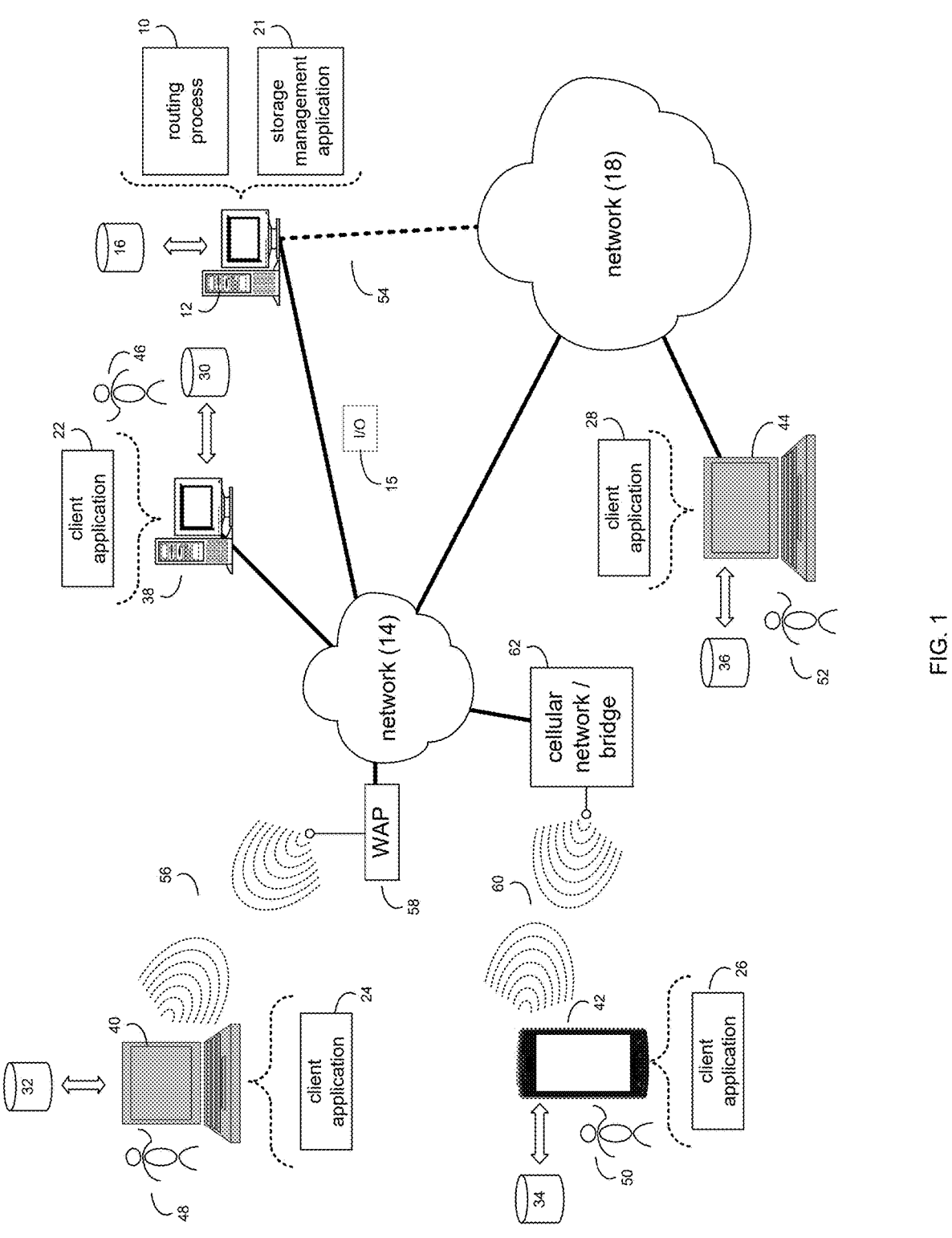
FIG. 1 is an example diagrammatic view of a routing process coupled to an example distributed computing network according to one or more example implementations of the disclosure.

System Overview:

In some implementations, the present disclosure may be embodied as a computer-implemented method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

Software may include artificial intelligence systems, which may include machine learning or other computational intelligence. For example, artificial intelligence (AI) may include one or more models used for one or more problem domains. When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

In some implementations, the various computing devices may include, integrate with, link to, exchange data with, be governed by, take inputs from, and/or provide outputs to one or more AI systems, which may include models, rule-based systems, expert systems, neural networks, deep learning systems, supervised learning systems, robotic process automation systems, natural language processing systems, intelligent agent systems, self-optimizing and self-organizing systems, and others. Except where context specifically indicates otherwise, references to AI, or to one or more examples of AI, should be understood to encompass one or more of these various alternative methods and systems; for example, without limitation, an AI system described for enabling any of a wide variety of functions, capabilities and solutions described herein (such as optimization, autonomous operation, prediction, control, orchestration, or the like) should be understood to be capable of implementation by operation on a model or rule set; by training on a training data set of human tag, labels, or the like; by training on a training data set of human interactions (e.g., human interactions with software interfaces or hardware systems); by training on a training data set of outcomes; by training on an AI-generated training data set (e.g., where a full training data set is generated by AI from a seed training data set); by supervised learning; by semi-supervised learning; by deep learning; or the like. For any given function or capability that is described herein, neural networks of various types may be used, including any of the types described herein, and in embodiments a hybrid set of neural networks may be selected such that within the set a neural network type that is more favorable for performing each element of a multifunction or multi-capability system or method is implemented. As one example among many, a deep learning, or black box, system may use a gated recurrent neural network for a function like language translation for an intelligent agent, where the underlying mechanisms of AI operation need not be understood as long as outcomes are favorably perceived by users, while a more transparent model or system and a simpler neural network may be used for a system for automated governance, where a greater understanding of how inputs are translated to outputs may be needed to comply with regulations or policies.

Examples of the models include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformers (GPT). Training a machine-learning model may include supervised learning (for example, based on labelled input data), unsupervised learning, and reinforcement learning. In various embodiments, a machine-learning model may be pre-trained by their operator or by a third party. Problem domains include nearly any situation where structured data can be collected, and includes natural language processing (NLP), computer vision (CV), classification, image recognition, etc. Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc. Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown routing process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a Redundant Array of Inexpensive Disks/Redundant Array of Independent Disks (RAID) device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a routing process, such as routing process 10 of FIG. 1, may receive, by a computing device, a communication sent from a first user. The communication may be analyzed to determine a topic of the communication. A second user associated with the topic of the communication may be identified. The communication may be routed to the second user based upon, at least in part, identifying the second user associated with the topic of communication and the topic of the communication.

In some implementations, as will be discussed below in greater detail, a routing process, such as routing process 10 of FIG. 1, may receive, by a computing device, a communication sent from a first user. Text of the communication may be analyzed to determine a topic of the communication. A second user associated with the topic of the communication may be identified. The communication may be routed to the second user based upon, at least in part, identifying the second user associated with the topic of communication and the topic of the communication.

In some implementations, as will be discussed below in greater detail, a routing process, such as routing process 10 of FIG. 1, may receive, by a computing device, a communication sent from a first user. An audio portion of the communication may be transcribed to determine a topic of the communication. A second user associated with the topic of the communication may be identified. The communication may be routed to the second user based upon, at least in part, identifying the second user associated with the topic of communication and the topic of the communication.

In some implementations, the instruction sets and subroutines of routing process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, routing process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, routing process 10 and/or storage management application 21 may be accessed via one or more of client applications 22, 24, 26, 28. In some implementations, routing process 10 may be a standalone application, or may be an applet/application/ script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within routing process 10, a component of routing process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of routing process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), a gateway application, a payment application, a non-payment application, a message service application, a custom application, a collaboration application (e.g., a web conferencing application, a video conferencing application, a voice-over-IP application, a video-over-IP application, a telephony application, an Instant Messaging (IM)/"chat" application, a chatbot application, an interactive voice response (IVR) application, a short messaging service (SMS)/multimedia messaging service (MMS) application, or other application that allows for virtual meeting and/or remote collaboration), and/or an automatic speech recognition application (e.g., an automatic speech recognition (ASR) application (e.g., modeling, transcription, etc.), a natural language understanding (NLU) application (e.g., machine learning, intent discovery, etc.), a text-to-speech (TTS) application (e.g., context awareness, learning, etc.), a speech signal enhancement (SSE) application (e.g., multi-zone processing/beamforming, noise suppression, etc.), a voice biometrics/wake-up-word processing application). The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of routing process 10 (and vice versa). Accordingly, in some implementations, routing process 10 may be a purely server-side application, a purely client-side application, or a hybrid server-side/client-side application that is cooperatively executed by one or more of client applications 22, 24, 26, 28 and/or routing process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, routing process 10, and storage management application 21, taken singly or in any combination, may effectuate some or all of the same functionality, any description of effectuating such functionality via one or more of client applications 22, 24, 26, 28, routing process 10, storage management application 21, or combination thereof, and any described interaction(s) between one or more of client applications 22, 24, 26, 28, routing process 10, storage management application 21, or combination thereof to effectuate such functionality, should be taken as an example only and not to limit the scope of the disclosure.

In some implementations, one or more of users 46, 48, 50, 52 may access computer 12 and routing process 10 (e.g., using one or more of client electronic devices 38, 40, 42, 44) directly through network 14 or through secondary network 18. Further, computer 12 may be connected to network 14 through secondary network 18, as illustrated with phantom link line 54. Routing process 10 may include one or more user interfaces, such as browsers and textual or graphical user interfaces, through which users 46, 48, 50, 52 may access routing process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
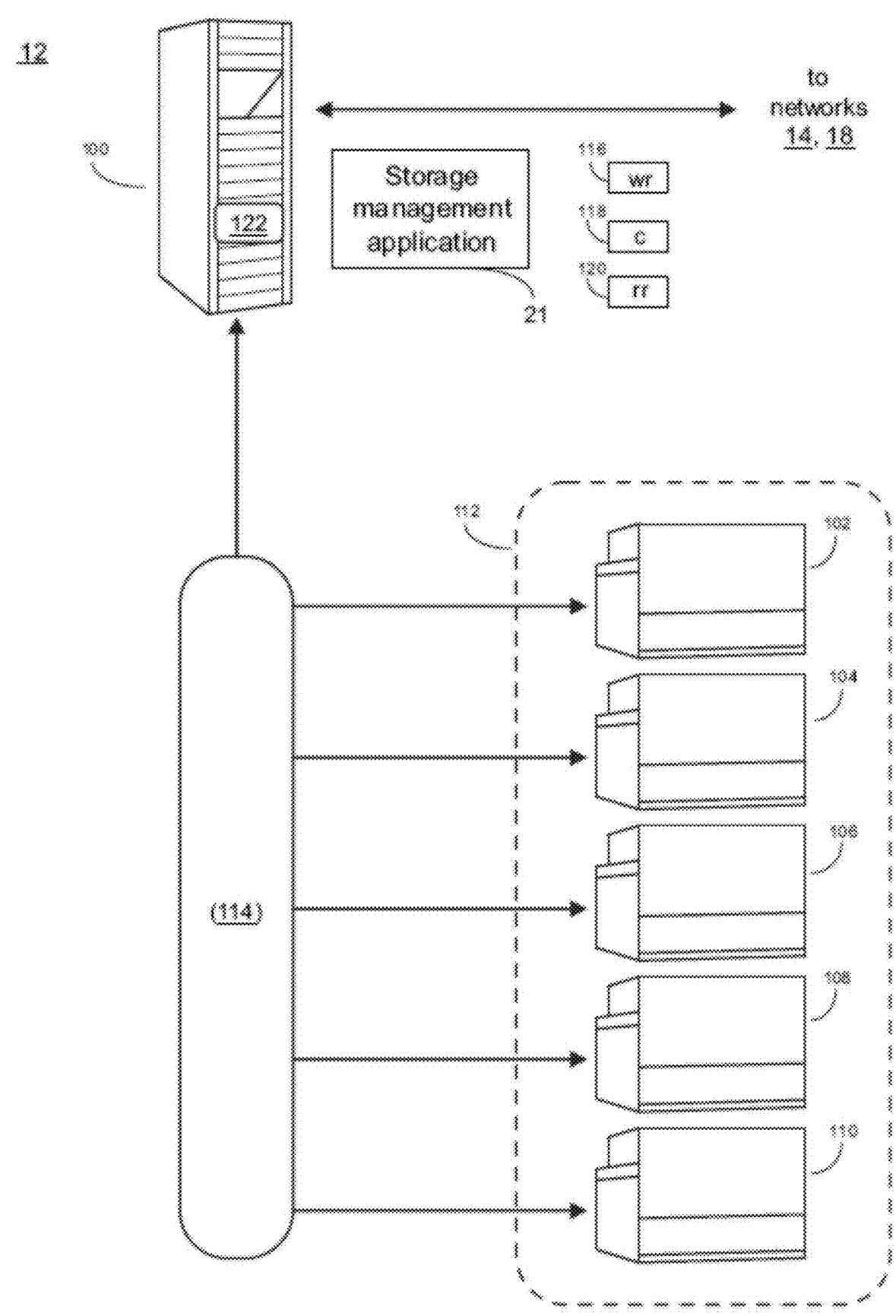
FIG. 2 is an example diagrammatic view of a storage system of FIG. 1 according to one or more example implementations of the disclosure.
Figure 3:
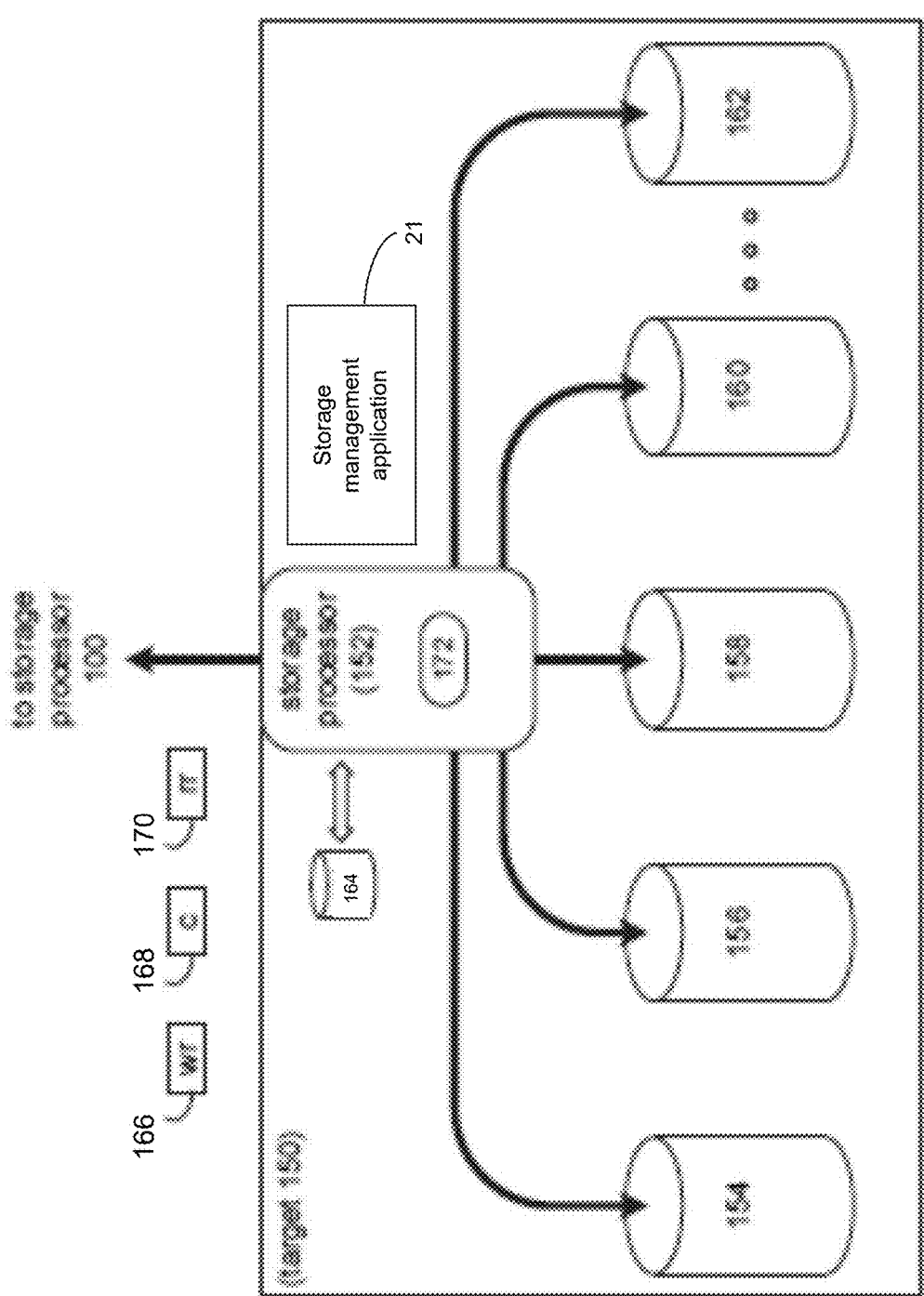
FIG. 3 is an example diagrammatic view of a storage target of FIG. 1 according to one or more example implementations of the disclosure.
Figure 5:
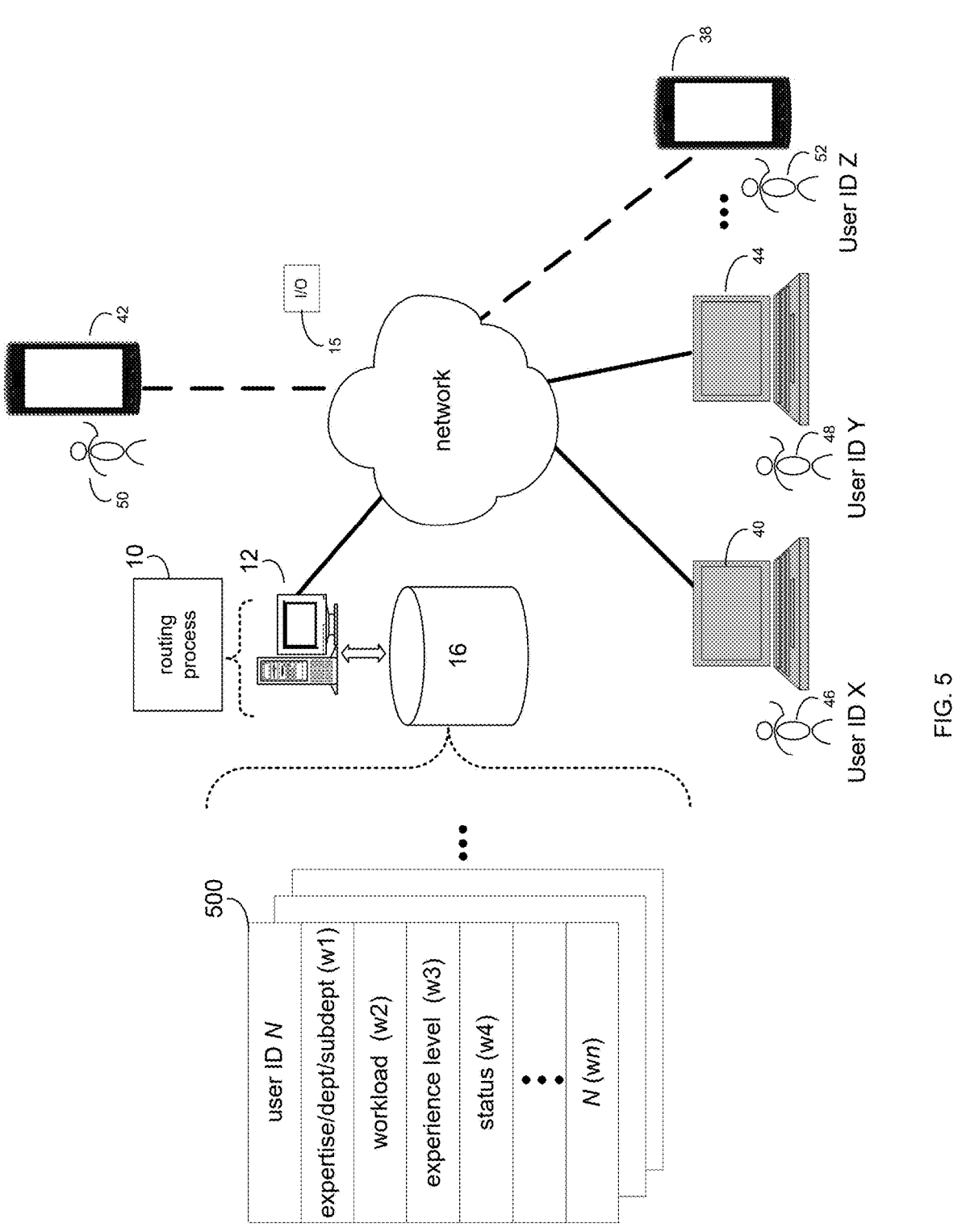
FIG. 5 is an example diagrammatic view of an example profile according to one or more example implementations of the disclosure.
Figure 6:
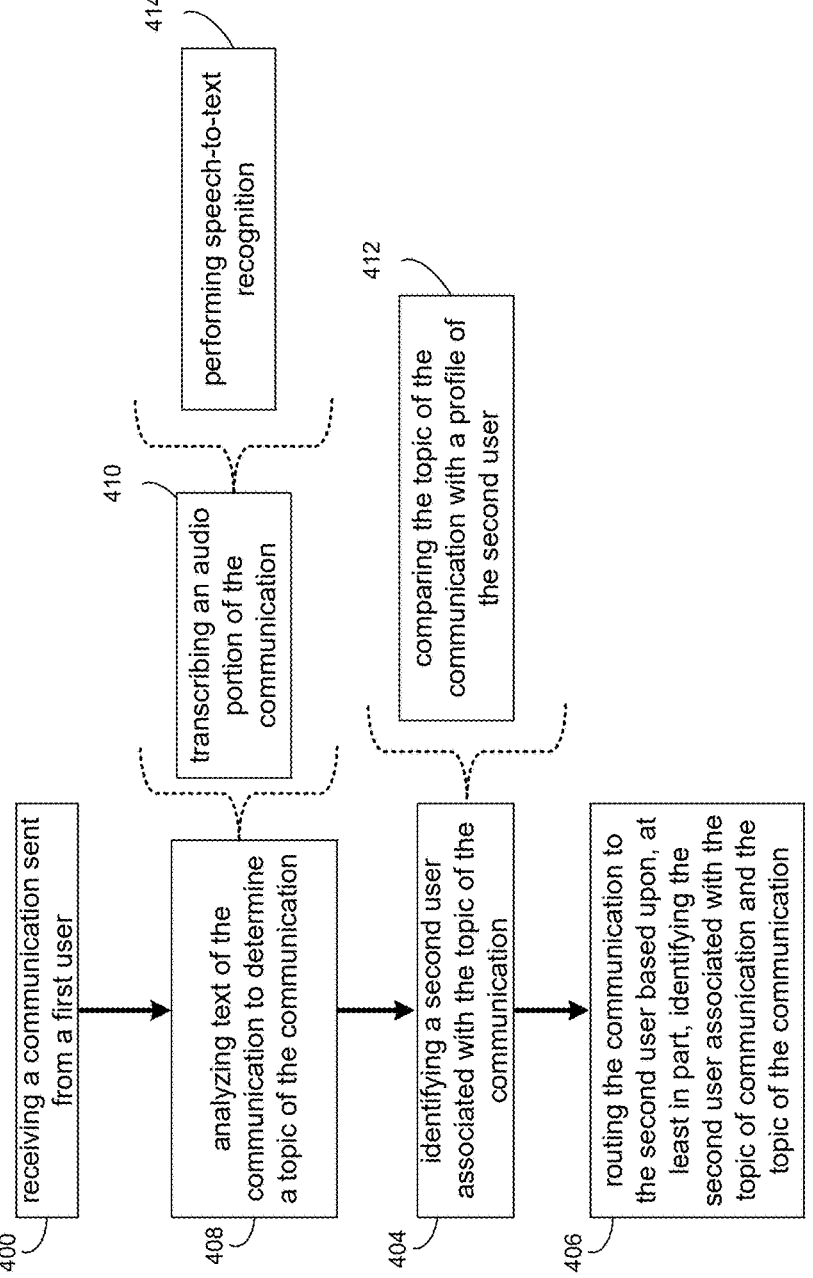
FIG. 6 is an example flowchart of a routing process according to one or more example implementations of the disclosure.
Figure 7:
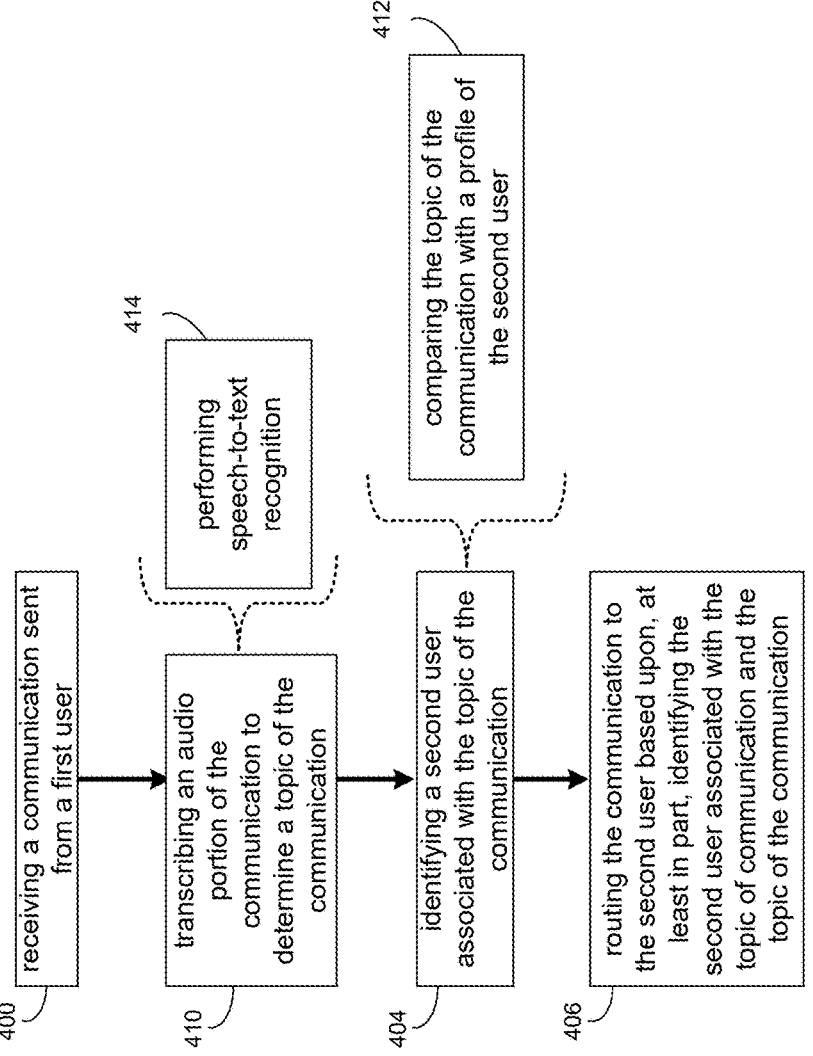
FIG. 7 is an example flowchart of a routing process according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, MA.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or routing process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, MA. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/ performance/capacity required.

In some implementations, one or more of storage devices 154, 156, 158, 160, 162 may be configured to store (e.g., via storage management process 21) coded data, wherein such coded data may allow for the regeneration of data lost/ corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/ capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Online financial transactions have made the world a much more convenient place. This includes things like online banking, mortgage services, etc. Every so often, a customer may have a question or some other issue, where they wish to voice their concern/complaint to a customer service representative. Currently, when a communication (e.g., a customer complaint) is received, an intake team reviews the complaint, and it is assigned in a round robin fashion to the customer complaint representatives (e.g., servicer). If it turns out that the servicer is too busy, or does not have the expertise to adequately address the complaint, the complaint must be manually sent or transferred to another servicer that is able to adequately address the complaint and/or is not too busy. This is time consuming for both the servicer and the customer, which results in frustration and a poor user experience. Therefore, as will be discussed in greater detail below, the present disclosure may analyze the communication (e.g., the complaint) and determine the best servicer to address the complaint using multiple factors.

As will be discussed below, routing process 10 may at least help, e.g., improve routing processes necessarily rooted in computer technology, in order to overcome an example and non-limiting problem specifically arising in the realm of computer networks and improve existing technological processes associated with, e.g., call routing being integrated into the practical application of enabling faster and more appropriate call routing based upon various parameters. It will be appreciated that the computer processes described throughout are integrated into one or more practical applications, and when taken at least as a whole are not considered to be well-understood, routine, and conventional functions.

As discussed above and referring also at least to the example implementations of FIGS. 4-7, routing process 10 may receive 400, by a computing device, a communication sent from a first user. Routing process 10 may analyze 402 the communication to determine a topic of the communication. Routing process 10 may identify 404 a second user associated with the topic of the communication. Routing process 10 may route 406 the communication to the second user based upon, at least in part, identifying the second user associated with the topic of communication and the topic of the communication.

The following examples are based on use cases involving financial institutions, such as those that provide lending services. However, it will be appreciated after reading the present disclosure that the concepts described may be applied to financial institutions that provide different services, as well as non-financial institutions. As such, the use of a financial institution providing lending services should be taken as example only and not to otherwise limit the scope of the present disclosure.

In some implementations, routing process 10 may receive 400, by a computing device, a communication sent from a first user. For instance, assume for example purposes only that a financial institution provides lending services and has multiple different departments (e.g., originations-application process, closing, settlement agency); servicing-escrow, insurance, lien release; default-loss litigation, foreclosure, bankruptcy, etc.). Further assume that a customer of the financial institution (e.g., user 50) wishes to provide their opinion (e.g., a complaint) or ask a question about some part of the loan process. In the example, as will be discussed in greater detail below, user 50 may initiate a communication (e.g., via I/O 15) with the financial institution using various different communication methods, such as an audio communication (e.g., VoIP, telephone, IVR, etc.), a video communication (e.g., video chat, online meeting, etc.), an electronic mail (email), a text message (e.g., SMS text message), a chatbot, and a chat between two or more people.

In some implementations, routing process 10 may analyze 402 the communication to determine a topic of the communication. For instance, to ensure that the communication of user 50 is routed (sent) to and received by the most appropriate (i.e., best suited) person, it may be beneficial to determine the topic of the communication. For instance, if the topic involves something about the application process, then the most appropriate person to speak with user 50 would be someone in the originations department. As another example, if the topic involves something about escrow, then the most appropriate person to speak with user 50 would be someone in the servicing department. As another example, if the topic involves something about foreclosure, then the most appropriate person to speak with user 50 would be someone in the default department, etc.

In some implementations, analyzing the communication to determine the topic of the communication may include analyzing 408 text of the communication. For instance, assume for example purposes only that the communication is an email sent from user 50 to the financial institution. In the example, routing process 10 may perform contextual analysis on various parts of the email (e.g., the subject line and the body of the email). In some implementations, routing process 10 may analyze the email using NLU processing for the contextual analysis, which may use general or subject matter specific models for financial institutions. For instance, assume for example purposes only that the body of the email includes something like, "I have a question about how to obtain a loan" or "I don't know what this question means." In the example, routing process 10 may use NLU processing to determine the context of the email involves the application process, and therefore involves the originations department. In some implementations, the contextual analysis may include keyword identification in the email. For instance, assume for example purposes only that the body of the email includes something like, "I have a question about the application process" or "I don't think you calculated my closing costs correctly." In the example, routing process 10 may use a keyword search to identify terms like "application process" and "closing" processing to determine the context of the email involves the application process, and therefore involves the originations department.

As another example, assume that the communication is a text message sent from user 50 to the financial institution. In the example, routing process 10 may perform contextual analysis on various parts of the text message (e.g., the body of the text message). In some implementations, routing process 10 may analyze the text message using NLU processing for the contextual analysis, which may use general or subject matter specific models for financial institutions. For instance, assume for example purposes only that the body of the text message includes something like, "I have a question about how to obtain a loan" or "I don't know what this question means." In the example, routing process 10 may use NLU processing to determine the context of the text message involves the application process, and therefore involves the originations department. In some implementations, the contextual analysis may include keyword identification in the text message. For instance, assume for example purposes only that the body of the text message includes something like, "I have a question about the application process" or "I don't think you calculated my closing costs correctly." In the example, routing process 10 may use a keyword search to identify terms like "application process" and "closing" processing to determine the context of the text message involves the application process, and therefore involves the originations department.

As another example, assume that the communication is a chat or chatbot communication between user 50 and a customer service representative or a chatbot of the financial institution. In the example, routing process 10 may perform contextual analysis on various parts of the chat or chatbot message (e.g., the body of the chat or chatbot message). In some implementations, routing process 10 may analyze the chat or chatbot message using NLU processing for the contextual analysis, which may use general or subject matter specific models for financial institutions. For instance, assume for example purposes only that the body of the chat or chatbot message includes something like, "I have a question about how to obtain a loan" or "I don't know what this question means." In the example, routing process 10 may use NLU processing to determine the context of the chat or chatbot message involves the application process, and therefore involves the originations department. In some implementations, the contextual analysis may include keyword identification in the chat or chatbot message. For instance, assume for example purposes only that the body of the chat or chatbot message includes something like, "I have a question about the application process" or "I don't think you calculated my closing costs correctly." In the example, routing process 10 may use a keyword search to identify terms like "application process" and "closing" processing to determine the context of the chat or chatbot message involves the application process, and therefore involves the originations department.

In some implementations, analyzing the text of the communication may include transcribing 410 an audio portion of the communication, which, in some implementations, transcribing the audio portion of the communication may include performing 414 speech-to-text recognition. For instance, assume that the communication is an audio communication between user 50 and a customer service representative (e.g., via VoIP, telephone, etc.) of the financial institution. In the example, routing process 10 may perform contextual analysis on various parts of the audio communication (e.g., by using speech-to-text recognition (with general or specific grammars) to transcribe the audio portions of the audio communication into text). In some implementations, routing process 10 may analyze the transcribed portions of the audio communication using NLU processing for the contextual analysis, which may use general or subject matter specific models for financial institutions. For instance, assume for example purposes only that the transcribed portions of the audio communication include something like, "I have a question about how to obtain a loan" or "I don't know what this question means." In the example, routing process 10 may use NLU processing to determine the context of the transcribed portions of the audio communication involves the application process, and therefore involves the originations department. In some implementations, the contextual analysis may include keyword identification in the transcribed portions of the audio communication. For instance, assume for example purposes only that the transcribed portions of the audio communication include something like, "I have a question about the application process" or "I don't think you calculated my closing costs correctly." In the example, routing process 10 may use a keyword search to identify terms like "application process" and "closing" processing to determine the context of the transcribed portions of the audio communication involves the application process, and therefore involves the originations department.

As another example, assume that the communication is an audio communication between user 50 and an interactive voice response (IVR) system (e.g., via VoIP, telephone, etc.) of the financial institution. In the example, routing process 10 may perform contextual analysis on various parts of the audio communication, such as the response to any prompts provided by the IVR system (e.g., by using speech-to-text recognition (with general or specific grammars) to transcribe the audio portions of the audio communication into text). In some implementations, routing process 10 may analyze the transcribed portions of the audio communication using NLU processing for the contextual analysis, which may use general or subject matter specific models for financial institutions. For instance, assume for example purposes only that the IVR system provides a prompt like, "Please tell me how I can help you today," and the transcribed portions of the audio communication response by user 50 includes something like, "I have a question about how to obtain a loan" or "I don't know what this question means." In the example, routing process 10 may use NLU processing to determine the context of the transcribed portions of the audio communication involves the application process, and therefore involves the originations department. In some implementations, the contextual analysis may include keyword identification in the transcribed portions of the audio communication. For instance, assume for example purposes only that the IVR system provides a prompt like, "Please tell me how I can help you today," and the transcribed portions of the audio communication response by user 50 include something like, "I have a question about the application process" or "I don't think you calculated my closing costs correctly." In the example, routing process 10 may use a keyword search to identify terms like "application process" and "closing" processing to determine the context of the transcribed portions of the audio communication involves the application process, and therefore involves the originations department.

As another example, assume that the communication is a video communication between user 50 and a customer service representative (e.g., via video chat, online meeting, etc.) of the financial institution. In the example, routing process 10 may perform contextual analysis on various parts of the audio portions of the video communication (e.g., by using speech-to-text recognition (with general or specific grammars) to transcribe the audio portions of the video communication into text, by using lip reading analysis, etc.). In some implementations, routing process 10 may analyze the transcribed portions of the audio portions of the video communication using NLU processing for the contextual analysis, which may use general or subject matter specific models for financial institutions. For instance, assume for example purposes only that the transcribed portions of the audio portions of the video communication include something like, "I have a question about how to obtain a loan" or "I don't know what this question means." In the example, routing process 10 may use NLU processing to determine the context of the transcribed portions of the audio portions of the video communication involves the application process, and therefore involves the originations department. In some implementations, the contextual analysis may include keyword identification in the transcribed portions of the audio portions of the video communication. For instance, assume for example purposes only that the transcribed portions of the audio portions of the video communication include something like, "I have a question about the application process" or "I don't think you calculated my closing costs correctly." In the example, routing process 10 may use a keyword search to identify terms like "application process" and "closing" processing to determine the context of the transcribed portions of the audio portions of the video communication involves the application process, and therefore involves the originations department.

In some implementations, routing process 10 may identify 404 a second user associated with the topic of the communication. For example, once the topic (e.g., originations) of the communication has been identified, routing process 10 may identify a second user (e.g., user 46) who is associated with the topic of the communication. For instance, assume for example purposes only that user 46 is one of many people in the originations department. As the topic of the communication is identified as involving originations, user 46 may be identified as one of the best (most knowledgeable) people with whom to address the communication of user 50.

In some implementations, the topic may be a subtopic, and the second user may be associated with the subtopic. For instance, assume for example purposes only that the identified topic is the settlement agency, which is a subtopic (or subdepartment) of the originations topic and department. In the example, assume that user 48 is one of many people in the originations department, but specializes in topics associated with settlement agencies. As the topic of the communication is identified as involving settlement agencies (a subtopic of originations), user 48 may be identified as one of the best (most knowledgeable) people with whom to address the communication of user 50. It will be appreciated after reading the present disclosure that multiple tiers of subtopics (e.g., sub-subtopics, sub-sub-subtopics, etc.) may be implemented without departing from the scope of the present disclosure. As such, the use of a topic and subtopic should be taken as example only and not to otherwise limit the scope of the present disclosure. In some implementations, identifying the second user associated with the topic of the communication may include comparing 412 the topic of the communication with a profile of the second user. For instance, and referring to the example implementation of FIG. 5, an example profile (e.g., profile 500) is shown. In the example, profile 500 may include various fields, such as user ID, expertise/dept/subdept, workload, experience level, status, etc. It will be appreciated after reading the present disclosure that more or less fields may be used without departing from the scope of the present disclosure.

In the example, each person in their respective department may be associated with their own profile 500. For instance, using user 46 as an example, the user ID may identify the profile as being associated with user 46. In the example, the expertise/dept/subdept may identify the particular expertise of user 46 (e.g., originations), and the particular department of user 46 (e.g., originations department). Thus, in the example above, as the topic of the communication is identified as involving originations, routing process 10 may compare the topic to the profile of user 46 to identify user 46 as one of the best (most knowledgeable) people with whom to address the communication of user 50. In some implementations, the expertise/dept/subdept may also denote the department they a servicer was trained at or hired from.

As another example, using user 48, the user ID may identify the profile as being associated with user 48. In the example, the expertise/dept/subdept. may identify the particular expertise of user 48 (e.g., originations), the particular department of user 48 (e.g., originations department), as well as the subdept (or subexpertise) (e.g., settlement agencies). Thus, in the example above, as the topic of the communication is identified as involving settlement agencies (a subtopic of originations), routing process 10 may compare the topic to the profile of user 48 to identify user 48 as one of the best (most knowledgeable) people with whom to address the communication of user 50.

In some implementations, identifying the second user associated with the topic of the communication may be based upon, at least in part, a weighting system. For instance, in some implementations, the weighting system may include one or more of an expertise of the second user, a current workload of the second user, an experience level of the second user, and a status of the second user. For example, the best user to speak with user 50 may be based on multiple parameters, and not just the topic or department. For instance, the most important determination for whom should receive the communication of user 50 may be the expertise/dept/subdept, as they are most likely to be able to handle the communication. Thus, in the example, the weight (w1) of this factor may be 0.9. However, it is possible that user 48 is overwhelmed with various communications in their queue from various other customers that involve settlement agencies, while other customer representatives (servicers) of the financial institution may have very few communications waiting in their queue. In order to spread the workload more evenly, the workload of the servicer (e.g., user 48) may be taken into account and given a weight (w2) of 0.6, since it is still possible that other servicers (e.g., user 46) in the originations department could still be able to handle the communication from user 50, even if they are not the "best" to handle it. As another example, the experience level of the servicer may also be weighted (w3) (e.g., 0.7). The experience level may include things like how long the servicer has been in a particular department, how long the servicer has been in the financial institution, the number of times the servicer has addressed a communication on a particular topic (or subtopic), their role in the company (e.g., servicer, manager, etc.), etc. As another example, the status of the servicer may also be weighted (w4) (e.g., 0.4). The status may include things like trainee, under review, hours worked in a week, earning overtime, etc. It will be appreciated after reading the present disclosure that various weighting systems may be used without departing from the scope of the present disclosure.

In some implementations, one or more of the fields may be given a subscore, which may be added up (before and/or after being weighed) to identify the second user. For instance, continuing with the above example where settlement agencies is the identified topic, as user 48 is associated with that particular area of expertise, that field may be given a score of 10, whereas user 46 may only get a score of 8, since user 46 lacks that specific area of expertise, but is still within the most appropriate department (i.e., originations). The subscore for user 48 in the expertise field may be 10(0.9)=9, where the subscore for user 46 in the expertise field may be 8(0.9)=7.2. The subscore for each field per profile 500 may be added together to obtain a routing score per servicer, and in some implementations, the user with the highest routing score may be identified as the best servicer to handle the communication from user 50.

In some implementations, a threshold routing score may need to be achieved to be considered as a servicer for a particular communication. For instance, assume for example purposes only that due to workload being so high for all servicers in the originations department, that a servicer in another department has the highest routing score. In the example, if the servicer in the other department (e.g., default) has the highest routing score, but it is below a threshold routing score (e.g., indicating they would likely not be able to handle the communication), then routing process 10 may ignore that servicer and go with the next highest routing score that reaches the threshold routing score.

In some implementations, routing process 10 may route 406 the communication to the second user based upon, at least in part, identifying the second user associated with the topic of communication and the topic of the communication. For instance, based upon the example routing score of each servicer in the department, subdepartment, company, etc., it may be determined that user 48 is the best servicer to address the communication from user 50, and as a result, routing process to may route the communication to user 48. In some implementations, the only profiles compared are those within the particular department of the identified topic (e.g., originations). In some implementations, the only profiles compared are those within the particular subdepartment of the identified subtopic (e.g., settlement agencies). In some implementations, the profiles of all servicers in the financial institution may be compared.

In some implementations, the communication may be routed automatically to the second user. For instance, once the topic and the best servicer has been identified, the communication may be automatically routed to that servicer. Conversely, in some implementations, the communication may be routed manually to the second user. For instance, the information identifying the topic and the best servicer to handle the communication may be provided to another user or third party (e.g., via popup window, email, text, feed, etc.) that may make the final decision as to whom will receive the communication. As another example, the selected servicer may determine that they cannot actually handle the communication (e.g., they are still too overloaded or they do not have the expertise needed, etc.), and routing process 10 may receive an input from that servicer to route the communication to the next best servicer. In some implementations, that servicer may be provided a list of servicers that may be selected to receive the communication.

As discussed above and referring also at least to the example implementations of FIGS. 4-7, routing process 10 may receive 400, by a computing device, a communication sent from a first user. Routing process 10 may analyze 408 text of the communication to determine a topic of the communication. Routing process 10 may identify 404 a second user associated with the topic of the communication. Routing process 10 may route 406 the communication to the second user based upon, at least in part, identifying the second user associated with the topic of communication and the topic of the communication.

In some implementations, routing process 10 may receive 400, by a computing device, a communication sent from a first user. For instance, assume for example purposes only that a financial institution provides lending services and has multiple different departments (e.g., originations-application process, closing, settlement agency); servicing—escrow, insurance, lien release; default—loss litigation, foreclosure, bankruptcy, etc.). Further assume that a customer of the financial institution (e.g., user 50) wishes to provide their opinion (e.g., a complaint) or ask a question about some part of the loan process. In the example, as will be discussed in greater detail below, user 50 may initiate a communication (e.g., via I/O 15) with the financial institution using various different communication methods, such as an audio communication (e.g., VoIP, telephone, IVR, etc.), a video communication (e.g., video chat, online meeting, etc.), an electronic mail (email), a text message (e.g., SMS text message), a chatbot, and a chat between two or more people.

In some implementations, routing process 10 may analyze 408 text of the communication to determine the topic of the communication. For instance, to ensure that the communication of user 50 is routed (sent) to and received by the most appropriate (i.e., best suited) person/servicer, it may be beneficial to determine the topic of the communication. For instance, if the topic involves something about the application process, then the most appropriate person to speak with user 50 would be someone in the originations department. As another example, if the topic involves something about escrow, then the most appropriate person to speak with user 50 would be someone in the servicing department. As another example, if the topic involves something about foreclosure, then the most appropriate person to speak with user 50 would be someone in the default department, etc.

As another example, assume for example purposes only that the communication is an email sent from user 50 to the financial institution. In the example, routing process 10 may perform contextual analysis on various parts of the email (e.g., the subject line and the body of the email). In some implementations, routing process 10 may analyze the email using NLU processing for the contextual analysis, which may use general or subject matter specific models for financial institutions. For instance, assume for example purposes only that the body of the email includes something like, "I have a question about how to obtain a loan" or "I don't know what this question means." In the example, routing process 10 may use NLU processing to determine the context of the email involves the application process, and therefore involves the originations department. In some implementations, the contextual analysis may include keyword identification in the email. For instance, assume for example purposes only that the body of the email includes something like, "I have a question about the application process" or "I don't think you calculated my closing costs correctly." In the example, routing process 10 may use a keyword search to identify terms like "application process" and "closing" processing to determine the context of the email involves the application process, and therefore involves the originations department.

As another example, assume that the communication is a text message sent from user 50 to the financial institution. In the example, routing process 10 may perform contextual analysis on various parts of the text message (e.g., the body of the text message). In some implementations, routing process 10 may analyze the text message using NLU processing for the contextual analysis, which may use general or subject matter specific models for financial institutions. For instance, assume for example purposes only that the body of the text message includes something like, "I have a question about how to obtain a loan" or "I don't know what this question means." In the example, routing process 10 may use NLU processing to determine the context of the text message involves the application process, and therefore involves the originations department. In some implementations, the contextual analysis may include keyword identification in the text message. For instance, assume for example purposes only that the body of the text message includes something like, "I have a question about the application process" or "I don't think you calculated my closing costs correctly." In the example, routing process 10 may use a keyword search to identify terms like "application process" and "closing" processing to determine the context of the text message involves the application process, and therefore involves the originations department.

As another example, assume that the communication is a chat or chatbot communication between user 50 and a customer service representative or a chatbot of the financial institution. In the example, routing process 10 may perform contextual analysis on various parts of the chat or chatbot message (e.g., the body of the chat or chatbot message). In some implementations, routing process 10 may analyze the chat or chatbot message using NLU processing for the contextual analysis, which may use general or subject matter specific models for financial institutions. For instance, assume for example purposes only that the body of the chat or chatbot message includes something like, "I have a question about how to obtain a loan" or "I don't know what this question means." In the example, routing process 10 may use NLU processing to determine the context of the chat or chatbot message involves the application process, and therefore involves the originations department. In some implementations, the contextual analysis may include keyword identification in the chat or chatbot message. For instance, assume for example purposes only that the body of the chat or chatbot message includes something like, "I have a question about the application process" or "I don't think you calculated my closing costs correctly." In the example, routing process 10 may use a keyword search to identify terms like "application process" and "closing" processing to determine the context of the chat or chatbot message involves the application process, and therefore involves the originations department.

In some implementations, analyzing the text of the communication may include transcribing 410 an audio portion of the communication, which, in some implementations, transcribing the audio portion of the communication may include performing 414 speech-to-text recognition. For instance, assume that the communication is an audio communication between user 50 and a customer service representative (e.g., via VoIP, telephone, etc.) of the financial institution. In the example, routing process 10 may perform contextual analysis on various parts of the audio communication (e.g., by using speech-to-text recognition (with general or specific grammars) to transcribe the audio portions of the audio communication into text). In some implementations, routing process 10 may analyze the transcribed portions of the audio communication using NLU processing for the contextual analysis, which may use general or subject matter specific models for financial institutions. For instance, assume for example purposes only that the transcribed portions of the audio communication include something like, "I have a question about how to obtain a loan" or "I don't know what this question means." In the example, routing process 10 may use NLU processing to determine the context of the transcribed portions of the audio communication involves the application process, and therefore involves the originations department. In some implementations, the contextual analysis may include keyword identification in the transcribed portions of the audio communication. For instance, assume for example purposes only that the transcribed portions of the audio communication include something like, "I have a question about the application process" or "I don't think you calculated my closing costs correctly." In the example, routing process 10 may use a keyword search to identify terms like "application process" and "closing" processing to determine the context of the transcribed portions of the audio communication involves the application process, and therefore involves the originations department.

As another example, assume that the communication is an audio communication between user 50 and an interactive voice response (IVR) system (e.g., via VoIP, telephone, etc.) of the financial institution. In the example, routing process 10 may perform contextual analysis on various parts of the audio communication, such as the response to any prompts provided by the IVR system (e.g., by using speech-to-text recognition (with general or specific grammars) to transcribe the audio portions of the audio communication into text). In some implementations, routing process 10 may analyze the transcribed portions of the audio communication using NLU processing for the contextual analysis, which may use general or subject matter specific models for financial institutions. For instance, assume for example purposes only that the IVR system provides a prompt like, "Please tell me how I can help you today," and the transcribed portions of the audio communication response by user 50 includes something like, "I have a question about how to obtain a loan" or "I don't know what this question means." In the example, routing process 10 may use NLU processing to determine the context of the transcribed portions of the audio communication involves the application process, and therefore involves the originations department. In some implementations, the contextual analysis may include keyword identification in the transcribed portions of the audio communication. For instance, assume for example purposes only that the IVR system provides a prompt like, "Please tell me how I can help you today," and the transcribed portions of the audio communication response by user 50 include something like, "I have a question about the application process" or "I don't think you calculated my closing costs correctly." In the example, routing process 10 may use a keyword search to identify terms like "application process" and "closing" processing to determine the context of the transcribed portions of the audio communication involves the application process, and therefore involves the originations department.

As another example, assume that the communication is a video communication between user 50 and a customer service representative (e.g., via video chat, online meeting, etc.) of the financial institution. In the example, routing process 10 may perform contextual analysis on various parts of the audio portions of the video communication (e.g., by using speech-to-text recognition (with general or specific grammars) to transcribe the audio portions of the video communication into text, by using lip reading analysis, etc.). In some implementations, routing process 10 may analyze the transcribed portions of the audio portions of the video communication using NLU processing for the contextual analysis, which may use general or subject matter specific models for financial institutions. For instance, assume for example purposes only that the transcribed portions of the audio portions of the video communication include something like, "I have a question about how to obtain a loan" or "I don't know what this question means." In the example, routing process 10 may use NLU processing to determine the context of the transcribed portions of the audio portions of the video communication involves the application process, and therefore involves the originations department. In some implementations, the contextual analysis may include keyword identification in the transcribed portions of the audio portions of the video communication. For instance, assume for example purposes only that the transcribed portions of the audio portions of the video communication include something like, "I have a question about the application process" or "I don't think you calculated my closing costs correctly." In the example, routing process 10 may use a keyword search to identify terms like "application process" and "closing" processing to determine the context of the transcribed portions of the audio portions of the video communication involves the application process, and therefore involves the originations department.

In some implementations, routing process 10 may identify 404 a second user associated with the topic of the communication. For example, once the topic (e.g., originations) of the communication has been identified, routing process 10 may identify a second user (e.g., user 46) who is associated with the topic of the communication. For instance, assume for example purposes only that user 46 is one of many people in the originations department. As the topic of the communication is identified as involving originations, user 46 may be identified as one of the best (most knowledgeable) people with whom to address the communication of user 50.

In some implementations, the topic may be a subtopic, and the second user may be associated with the subtopic. For instance, assume for example purposes only that the identified topic is the settlement agency, which is a subtopic (or subdepartment) of the originations topic and department. In the example, assume that user 48 is one of many people in the originations department, but specializes in topics associated with settlement agencies. As the topic of the communication is identified as involving settlement agencies (a subtopic of originations), user 48 may be identified as one of the best (most knowledgeable) people with whom to address the communication of user 50. It will be appreciated after reading the present disclosure that multiple tiers of subtopics (e.g., sub-subtopics, sub-sub-subtopics, etc.) may be implemented without departing from the scope of the present disclosure. As such, the use of a topic and subtopic should be taken as example only and not to otherwise limit the scope of the present disclosure.

In some implementations, identifying the second user associated with the topic of the communication may include comparing 412 the topic of the communication with a profile of the second user. For instance, and referring to the example implementation of FIG. 5, an example profile (e.g., profile 500) is shown. In the example, profile 500 may include various fields, such as user ID, expertise/dept/subdept, workload, experience level, status, etc. It will be appreciated after reading the present disclosure that more or less fields may be used without departing from the scope of the present disclosure.

In the example, each person in their respective department may be associated with their own profile 500. For instance, using user 46 as an example, the user ID may identify the profile as being associated with user 46. In the example, the expertise/dept/subdept may identify the particular expertise of user 46 (e.g., originations), and the particular department of user 46 (e.g., originations department). Thus, in the example above, as the topic of the communication is identified as involving originations, routing process 10 may compare the topic to the profile of user 46 to identify user 46 as one of the best (most knowledgeable) people with whom to address the communication of user 50. In some implementations, the expertise/dept/subdept may also denote the department they a servicer was trained at or hired from.

As another example, using user 48, the user ID may identify the profile as being associated with user 48. In the example, the expertise/dept/subdept. may identify the particular expertise of user 48 (e.g., originations), the particular department of user 48 (e.g., originations department), as well as the subdept (or subexpertise) (e.g., settlement agencies). Thus, in the example above, as the topic of the communication is identified as involving settlement agencies (a subtopic of originations), routing process 10 may compare the topic to the profile of user 48 to identify user 48 as one of the best (most knowledgeable) people with whom to address the communication of user 50.

In some implementations, identifying the second user associated with the topic of the communication may be based upon, at least in part, a weighting system. For instance, in some implementations, the weighting system may include one or more of an expertise of the second user, a current workload of the second user, an experience level of the second user, and a status of the second user. For example, the best user to speak with user 50 may be based on multiple parameters, and not just the topic or department. For instance, the most important determination for whom should receive the communication of user 50 may be the expertise/dept/subdept, as they are most likely to be able to handle the communication. Thus, in the example, the weight (w1) of this factor may be 0.9. However, it is possible that user 48 is overwhelmed with various communications in their queue from various other customers that involve settlement agencies, while other customer representatives (servicers) of the financial institution may have very few communications waiting in their queue. In order to spread the workload more evenly, the workload of the servicer (e.g., user 48) may be taken into account and given a weight (w2) of 0.6, since it is still possible that other servicers (e.g., user 46) in the originations department could still be able to handle the communication from user 50, even if they are not the "best" to handle it. As another example, the experience level of the servicer may also be weighted (w3) (e.g., 0.7). The experience level may include things like how long the servicer has been in a particular department, how long the servicer has been in the financial institution, the number of times the servicer has addressed a communication on a particular topic (or subtopic), their role in the company (e.g., servicer, manager, etc.), etc. As another example, the status of the servicer may also be weighted (w4) (e.g., 0.4). The status may include things like trainee, under review, hours worked in a week, earning overtime, etc. It will be appreciated after reading the present disclosure that various weighting systems may be used without departing from the scope of the present disclosure.

In some implementations, one or more of the fields may be given a subscore, which may be added up (before and/or after being weighed) to identify the second user. For instance, continuing with the above example where settlement agencies is the identified topic, as user 48 is associated with that particular area of expertise, that field may be given a score of 10, whereas user 46 may only get a score of 8, since user 46 lacks that specific area of expertise, but is still within the most appropriate department (i.e., originations). The subscore for user 48 in the expertise field may be 10(0.9)=9, where the subscore for user 46 in the expertise field may be 8(0.9)=7.2. The subscore for each field per profile 500 may be added together to obtain a routing score per servicer, and in some implementations, the user with the highest routing score may be identified as the best servicer to handle the communication from user 50.

In some implementations, a threshold routing score may need to be achieved to be considered as a servicer for a particular communication. For instance, assume for example purposes only that due to workload being so high for all servicers in the originations department, that a servicer in another department has the highest routing score. In the example, if the servicer in the other department (e.g., default) has the highest routing score, but it is below a threshold routing score (e.g., indicating they would likely not be able to handle the communication), then routing process 10 may ignore that servicer and go with the next highest routing score that reaches the threshold routing score.

In some implementations, routing process 10 may route 406 the communication to the second user based upon, at least in part, identifying the second user associated with the topic of communication and the topic of the communication. For instance, based upon the example routing score of each servicer in the department, subdepartment, company, etc., it may be determined that user 48 is the best servicer to address the communication from user 50, and as a result, routing process to may route the communication to user 48. In some implementations, the only profiles compared are those within the particular department of the identified topic (e.g., originations). In some implementations, the only profiles compared are those within the particular subdepartment of the identified subtopic (e.g., settlement agencies). In some implementations, the profiles of all servicers in the financial institution may be compared.

In some implementations, the communication may be routed automatically to the second user. For instance, once the topic and the best servicer has been identified, the communication may be automatically routed to that servicer. Conversely, in some implementations, the communication may be routed manually to the second user. For instance, the information identifying the topic and the best servicer to handle the communication may be provided to another user or third party (e.g., via popup window, email, text, feed, etc.) that may make the final decision as to whom will receive the communication. As another example, the selected servicer may determine that they cannot actually handle the communication (e.g., they are still too overloaded or they do not have the expertise needed, etc.), and routing process 10 may receive an input from that servicer to route the communication to the next best servicer. In some implementations, that servicer may be provided a list of servicers that may be selected to receive the communication.

As discussed above and referring also at least to the example implementations of FIGS. 4-7, routing process 10 may receive 400, by a computing device, a communication sent from a first user. Routing process 10 may transcribe 410 an audio portion of the communication to determine a topic of the communication. Routing process 10 may identify 404 a second user associated with the topic of the communication. Routing process 10 may route 406 the communication to the second user based upon, at least in part, identifying the second user associated with the topic of communication and the topic of the communication.

In some implementations, routing process 10 may receive 400, by a computing device, a communication sent from a first user. For instance, assume for example purposes only that a financial institution provides lending services and has multiple different departments (e.g., originations-application process, closing, settlement agency); servicing-escrow, insurance, lien release; default-loss litigation, foreclosure, bankruptcy, etc.). Further assume that a customer of the financial institution (e.g., user 50) wishes to provide their opinion (e.g., a complaint) or ask a question about some part of the loan process. In the example, as will be discussed in greater detail below, user 50 may initiate a communication (e.g., via I/O 15) with the financial institution using various different communication methods, such as an audio communication (e.g., VoIP, telephone, IVR, etc.), a video communication (e.g., video chat, online meeting, etc.), an electronic mail (email), a text message (e.g., SMS text message), a chatbot, and a chat between two or more people.

In some implementations, routing process 10 may analyze text of the communication to determine the topic of the communication. For instance, to ensure that the communication of user 50 is routed (sent) to and received by the most appropriate (i.e., best suited) person/servicer, it may be beneficial to determine the topic of the communication. For instance, if the topic involves something about the application process, then the most appropriate person to speak with user 50 would be someone in the originations department. As another example, if the topic involves something about escrow, then the most appropriate person to speak with user 50 would be someone in the servicing department. As another example, if the topic involves something about foreclosure, then the most appropriate person to speak with user 50 would be someone in the default department, etc.

As another example, assume for example purposes only that the communication is an email sent from user 50 to the financial institution. In the example, routing process 10 may perform contextual analysis on various parts of the email (e.g., the subject line and the body of the email). In some implementations, routing process 10 may analyze the email using NLU processing for the contextual analysis, which may use general or subject matter specific models for financial institutions. For instance, assume for example purposes only that the body of the email includes something like, "I have a question about how to obtain a loan" or "I don't know what this question means." In the example, routing process 10 may use NLU processing to determine the context of the email involves the application process, and therefore involves the originations department. In some implementations, the contextual analysis may include keyword identification in the email. For instance, assume for example purposes only that the body of the email includes something like, "I have a question about the application process" or "I don't think you calculated my closing costs correctly." In the example, routing process 10 may use a keyword search to identify terms like "application process" and "closing" processing to determine the context of the email involves the application process, and therefore involves the originations department.

As another example, assume that the communication is a text message sent from user 50 to the financial institution. In the example, routing process 10 may perform contextual analysis on various parts of the text message (e.g., the body of the text message). In some implementations, routing process 10 may analyze the text message using NLU processing for the contextual analysis, which may use general or subject matter specific models for financial institutions. For instance, assume for example purposes only that the body of the text message includes something like, "I have a question about how to obtain a loan" or "I don't know what this question means." In the example, routing process 10 may use NLU processing to determine the context of the text message involves the application process, and therefore involves the originations department. In some implementations, the contextual analysis may include keyword identification in the text message. For instance, assume for example purposes only that the body of the text message includes something like, "I have a question about the application process" or "I don't think you calculated my closing costs correctly." In the example, routing process 10 may use a keyword search to identify terms like "application process" and "closing" processing to determine the context of the text message involves the application process, and therefore involves the originations department.

As another example, assume that the communication is a chat or chatbot communication between user 50 and a customer service representative or a chatbot of the financial institution. In the example, routing process 10 may perform contextual analysis on various parts of the chat or chatbot message (e.g., the body of the chat or chatbot message). In some implementations, routing process 10 may analyze the chat or chatbot message using NLU processing for the contextual analysis, which may use general or subject matter specific models for financial institutions. For instance, assume for example purposes only that the body of the chat or chatbot message includes something like, "I have a question about how to obtain a loan" or "I don't know what this question means." In the example, routing process 10 may use NLU processing to determine the context of the chat or chatbot message involves the application process, and therefore involves the originations department. In some implementations, the contextual analysis may include keyword identification in the chat or chatbot message. For instance, assume for example purposes only that the body of the chat or chatbot message includes something like, "I have a question about the application process" or "I don't think you calculated my closing costs correctly." In the example, routing process 10 may use a keyword search to identify terms like "application process" and "closing" processing to determine the context of the chat or chatbot message involves the application process, and therefore involves the originations department.

In some implementations, routing process 10 may analyze the text of the communication by transcribing 410 an audio portion of the communication, which, in some implementations, transcribing the audio portion of the communication may include performing 414 speech-to-text recognition. For instance, assume that the communication is an audio communication between user 50 and a customer service representative (e.g., via VoIP, telephone, etc.) of the financial institution. In the example, routing process 10 may perform contextual analysis on various parts of the audio communication (e.g., by using speech-to-text recognition (with general or specific grammars) to transcribe the audio portions of the audio communication into text). In some implementations, routing process 10 may analyze the transcribed portions of the audio communication using NLU processing for the contextual analysis, which may use general or subject matter specific models for financial institutions. For instance, assume for example purposes only that the transcribed portions of the audio communication include something like, "I have a question about how to obtain a loan" or "I don't know what this question means." In the example, routing process 10 may use NLU processing to determine the context of the transcribed portions of the audio communication involves the application process, and therefore involves the originations department. In some implementations, the contextual analysis may include keyword identification in the transcribed portions of the audio communication. For instance, assume for example purposes only that the transcribed portions of the audio communication include something like, "I have a question about the application process" or "I don't think you calculated my closing costs correctly." In the example, routing process 10 may use a keyword search to identify terms like "application process" and "closing" processing to determine the context of the transcribed portions of the audio communication involves the application process, and therefore involves the originations department.

As another example, assume that the communication is an audio communication between user 50 and an interactive voice response (IVR) system (e.g., via VoIP, telephone, etc.) of the financial institution. In the example, routing process 10 may perform contextual analysis on various parts of the audio communication, such as the response to any prompts provided by the IVR system (e.g., by using speech-to-text recognition (with general or specific grammars) to transcribe the audio portions of the audio communication into text). In some implementations, routing process 10 may analyze the transcribed portions of the audio communication using NLU processing for the contextual analysis, which may use general or subject matter specific models for financial institutions. For instance, assume for example purposes only that the IVR system provides a prompt like, "Please tell me how I can help you today," and the transcribed portions of the audio communication response by user 50 includes something like, "I have a question about how to obtain a loan" or "I don't know what this question means." In the example, routing process 10 may use NLU processing to determine the context of the transcribed portions of the audio communication involves the application process, and therefore involves the originations department. In some implementations, the contextual analysis may include keyword identification in the transcribed portions of the audio communication. For instance, assume for example purposes only that the IVR system provides a prompt like, "Please tell me how I can help you today," and the transcribed portions of the audio communication response by user 50 include something like, "I have a question about the application process" or "I don't think you calculated my closing costs correctly." In the example, routing process 10 may use a keyword search to identify terms like "application process" and "closing" processing to determine the context of the transcribed portions of the audio communication involves the application process, and therefore involves the originations department.

As another example, assume that the communication is a video communication between user 50 and a customer service representative (e.g., via video chat, online meeting, etc.) of the financial institution. In the example, routing process 10 may perform contextual analysis on various parts of the audio portions of the video communication (e.g., by using speech-to-text recognition (with general or specific grammars) to transcribe the audio portions of the video communication into text, by using lip reading analysis, etc.). In some implementations, routing process 10 may analyze the transcribed portions of the audio portions of the video communication using NLU processing for the contextual analysis, which may use general or subject matter specific models for financial institutions. For instance, assume for example purposes only that the transcribed portions of the audio portions of the video communication include something like, "I have a question about how to obtain a loan" or "I don't know what this question means." In the example, routing process 10 may use NLU processing to determine the context of the transcribed portions of the audio portions of the video communication involves the application process, and therefore involves the originations department. In some implementations, the contextual analysis may include keyword identification in the transcribed portions of the audio portions of the video communication. For instance, assume for example purposes only that the transcribed portions of the audio portions of the video communication include something like, "I have a question about the application process" or "I don't think you calculated my closing costs correctly." In the example, routing process 10 may use a keyword search to identify terms like "application process" and "closing" processing to determine the context of the transcribed portions of the audio portions of the video communication involves the application process, and therefore involves the originations department.

In some implementations, routing process 10 may identify 404 a second user associated with the topic of the communication. For example, once the topic (e.g., originations) of the communication has been identified, routing process 10 may identify a second user (e.g., user 46) who is associated with the topic of the communication. For instance, assume for example purposes only that user 46 is one of many people in the originations department. As the topic of the communication is identified as involving originations, user 46 may be identified as one of the best (most knowledgeable) people with whom to address the communication of user 50.

In some implementations, the topic may be a subtopic, and the second user may be associated with the subtopic. For instance, assume for example purposes only that the identified topic is the settlement agency, which is a subtopic (or subdepartment) of the originations topic and department. In the example, assume that user 48 is one of many people in the originations department, but specializes in topics associated with settlement agencies. As the topic of the communication is identified as involving settlement agencies (a subtopic of originations), user 48 may be identified as one of the best (most knowledgeable) people with whom to address the communication of user 50. It will be appreciated after reading the present disclosure that multiple tiers of subtopics (e.g., sub-subtopics, sub-sub-subtopics, etc.) may be implemented without departing from the scope of the present disclosure. As such, the use of a topic and subtopic should be taken as example only and not to otherwise limit the scope of the present disclosure.

In some implementations, identifying the second user associated with the topic of the communication may include comparing 412 the topic of the communication with a profile of the second user. For instance, and referring to the example implementation of FIG. 5, an example profile (e.g., profile 500) is shown. In the example, profile 500 may include various fields, such as user ID, expertise/dept/subdept, workload, experience level, status, etc. It will be appreciated after reading the present disclosure that more or less fields may be used without departing from the scope of the present disclosure.

In the example, each person in their respective department may be associated with their own profile 500. For instance, using user 46 as an example, the user ID may identify the profile as being associated with user 46. In the example, the expertise/dept/subdept may identify the particular expertise of user 46 (e.g., originations), and the particular department of user 46 (e.g., originations department). Thus, in the example above, as the topic of the communication is identified as involving originations, routing process 10 may compare the topic to the profile of user 46 to identify user 46 as one of the best (most knowledgeable) people with whom to address the communication of user 50. In some implementations, the expertise/dept/subdept may also denote the department they a servicer was trained at or hired from.

As another example, using user 48, the user ID may identify the profile as being associated with user 48. In the example, the expertise/dept/subdept. may identify the particular expertise of user 48 (e.g., originations), the particular department of user 48 (e.g., originations department), as well as the subdept (or subexpertise) (e.g., settlement agencies). Thus, in the example above, as the topic of the communication is identified as involving settlement agencies (a subtopic of originations), routing process 10 may compare the topic to the profile of user 48 to identify user 48 as one of the best (most knowledgeable) people with whom to address the communication of user 50.

In some implementations, identifying the second user associated with the topic of the communication may be based upon, at least in part, a weighting system. For instance, in some implementations, the weighting system may include one or more of an expertise of the second user, a current workload of the second user, an experience level of the second user, and a status of the second user. For example, the best user to speak with user 50 may be based on multiple parameters, and not just the topic or department. For instance, the most important determination for whom should receive the communication of user 50 may be the expertise/dept/subdept, as they are most likely to be able to handle the communication. Thus, in the example, the weight (w1) of this factor may be 0.9. However, it is possible that user 48 is overwhelmed with various communications in their queue from various other customers that involve settlement agencies, while other customer representatives (servicers) of the financial institution may have very few communications waiting in their queue. In order to spread the workload more evenly, the workload of the servicer (e.g., user 48) may be taken into account and given a weight (w2) of 0.6, since it is still possible that other servicers (e.g., user 46) in the originations department could still be able to handle the communication from user 50, even if they are not the "best" to handle it. As another example, the experience level of the servicer may also be weighted (w3) (e.g., 0.7). The experience level may include things like how long the servicer has been in a particular department, how long the servicer has been in the financial institution, the number of times the servicer has addressed a communication on a particular topic (or subtopic), their role in the company (e.g., servicer, manager, etc.), etc. As another example, the status of the servicer may also be weighted (w4) (e.g., 0.4). The status may include things like trainee, under review, hours worked in a week, earning overtime, etc. It will be appreciated after reading the present disclosure that various weighting systems may be used without departing from the scope of the present disclosure.

In some implementations, one or more of the fields may be given a subscore, which may be added up (before and/or after being weighed) to identify the second user. For instance, continuing with the above example where settlement agencies is the identified topic, as user 48 is associated with that particular area of expertise, that field may be given a score of 10, whereas user 46 may only get a score of 8, since user 46 lacks that specific area of expertise, but is still within the most appropriate department (i.e., originations). The subscore for user 48 in the expertise field may be 10(0.9)=9, where the subscore for user 46 in the expertise field may be 8(0.9)=7.2. The subscore for each field per profile 500 may be added together to obtain a routing score per servicer, and in some implementations, the user with the highest routing score may be identified as the best servicer to handle the communication from user 50.

In some implementations, a threshold routing score may need to be achieved to be considered as a servicer for a particular communication. For instance, assume for example purposes only that due to workload being so high for all servicers in the originations department, that a servicer in another department has the highest routing score. In the example, if the servicer in the other department (e.g., default) has the highest routing score, but it is below a threshold routing score (e.g., indicating they would likely not be able to handle the communication), then routing process 10 may ignore that servicer and go with the next highest routing score that reaches the threshold routing score.

In some implementations, routing process 10 may route 406 the communication to the second user based upon, at least in part, identifying the second user associated with the topic of communication and the topic of the communication. For instance, based upon the example routing score of each servicer in the department, subdepartment, company, etc., it may be determined that user 48 is the best servicer to address the communication from user 50, and as a result, routing process to may route the communication to user 48. In some implementations, the only profiles compared are those within the particular department of the identified topic (e.g., originations). In some implementations, the only profiles compared are those within the particular subdepartment of the identified subtopic (e.g., settlement agencies). In some implementations, the profiles of all servicers in the financial institution may be compared.

In some implementations, the communication may be routed automatically to the second user. For instance, once the topic and the best servicer has been identified, the communication may be automatically routed to that servicer. Conversely, in some implementations, the communication may be routed manually to the second user. For instance, the information identifying the topic and the best servicer to handle the communication may be provided to another user or third party (e.g., via popup window, email, text, feed, etc.) that may make the final decision as to whom will receive the communication. As another example, the selected servicer may determine that they cannot actually handle the communication (e.g., they are still too overloaded or they do not have the expertise needed, etc.), and routing process 10 may receive an input from that servicer to route the communication to the next best servicer. In some implementations, that servicer may be provided a list of servicers that may be selected to receive the communication.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, comprising:

receiving, by a computing device, a communication sent from a first client device of a first user;

analyzing text of the communication to determine a topic of the communication;

identifying a second user associated with the topic of the communication by:

applying a weighting system by generating a subscore for each field of a plurality of fields in a profile of the second user, wherein the plurality of fields includes a subtopic of the topic of the communication, an expertise of the second user, a current workload of the second user, an experience level of the second user, and a status of the second user, combining each generated subscore to generate a routing score, and comparing the topic of the communication with the profile of the second user; and routing the communication to a second client device of the second user based upon, at least in part, identifying the second user associated with the topic of communication, the topic of the communication, and the generated routing score.

2. The computer-implemented method of claim 1, wherein analyzing the text of the communication includes transcribing an audio portion of the communication.

3. The computer-implemented method of claim 2, wherein transcribing the audio portion of the communication includes performing speech-to-text recognition.

4. The computer-implemented method of claim 1, wherein the communication is routed automatically to the second user.

5. The computer-implemented method of claim 1, wherein the routing score is a rank identifying the second user when the routing score reaches a threshold routing score.

6. A computer program product residing on a computer readable storage medium having a plurality of instructions stored thereon which, when executed across one or more processors, causes at least a portion of the one or more processors to perform operations comprising:

receiving a communication sent from a first user;

analyzing text of the communication to determine a topic of the communication;

identifying a second user associated with the topic of the communication by:

applying a weighting system by generating a subscore for each field of a plurality of fields in a profile of the second user, wherein the plurality of fields includes a subtopic of the topic of the communication, an expertise of the second user, a current workload of the second user, an experience level of the second user, and a status of the second user, combining each generated subscore to generate a routing score, and comparing the topic of the communication with the profile of the second user; and routing the communication to the second user based upon, at least in part, identifying the second user associated with the topic of communication, the topic of the communication, and the generated routing score.

7. The computer program product of claim 6, wherein analyzing the text of the communication includes transcribing an audio portion of the communication.

8. The computer program product of claim 7, wherein transcribing the audio portion of the communication includes performing speech-to-text recognition.

9. The computer program product of claim 6, wherein the communication is routed automatically to the second user.

10. The computer program product of claim 6, wherein the routing score is a rank identifying the second user when the routing score reaches a threshold routing score.

11. A computing system including one or more processors and one or more memories configured to perform operations comprising:

receiving a communication sent from a first user;

analyzing text of the communication to determine a topic of the communication;

identifying a second user associated with the topic of the communication by:

applying a weighting system by generating a subscore for each field of a plurality of fields in a profile of the second user, wherein the plurality of fields includes a subtopic of the topic of the communication, an expertise of the second user, a current workload of the second user, an experience level of the second user, and a status of the second user, combining each generated subscore to generate a routing score, and comparing the topic of the communication with the profile of the second user; and routing the communication to the second user based upon, at least in part, identifying the second user associated with the topic of communication, the topic of the communication, and the generated routing score.

12. The computing system of claim 11, wherein analyzing the text of the communication includes transcribing an audio portion of the communication.

13. The computing system of claim 12, wherein transcribing the audio portion of the communication includes performing speech-to-text recognition.

14. The computing system of claim 11, wherein the communication is routed automatically to the second user.

15. The computing system of claim 11, wherein the routing score is a rank identifying the second user when the routing score reaches a threshold routing score.

* * * * *